United States Patent [19]

Elliott

[11] Patent Number: 4,677,507

[45] Date of Patent: Jun. 30, 1987

[54] DIGITAL VELOCITY CONTROL FOR A DISK DRIVE SERVO SYSTEM

[75] Inventor: Mark L. Elliott, Eden Prairie, Minn.

[73] Assignee: Magnetic Peripherals Inc., Bloomington, Minn.

[21] Appl. No.: 869,269

[22] Filed: May 30, 1986

[51] Int. Cl.$^4$ .............................................. G11B 5/55
[52] U.S. Cl. ..................................................... 360/78
[58] Field of Search ......................................... 360/78

[56] References Cited

U.S. PATENT DOCUMENTS

| | | | |
|---|---|---|---|
| 4,172,267 | 10/1979 | Sidman | 360/78 |
| 4,288,731 | 9/1981 | Lee | 360/78 |

Primary Examiner—George G. Stellar
Attorney, Agent, or Firm—J. A. Genovese; E. P. Heller, III

[57] ABSTRACT

A high velocity seek deceleration technique is disclosed for seek operations of disk drives wherein measured time per track is compared to a predetermined time per track in a memory as indexed by number of tracks to end of seek determines an error value which adjusts a deceleration amplifier. The gain of digital output to the amplifier is adjusted depending on the number of tracks to end of seek, the higher the number, the higher the gain. Further, a variable bandwidth filter is employed to increase bandwidth as velocity decreases.

3 Claims, 3 Drawing Figures

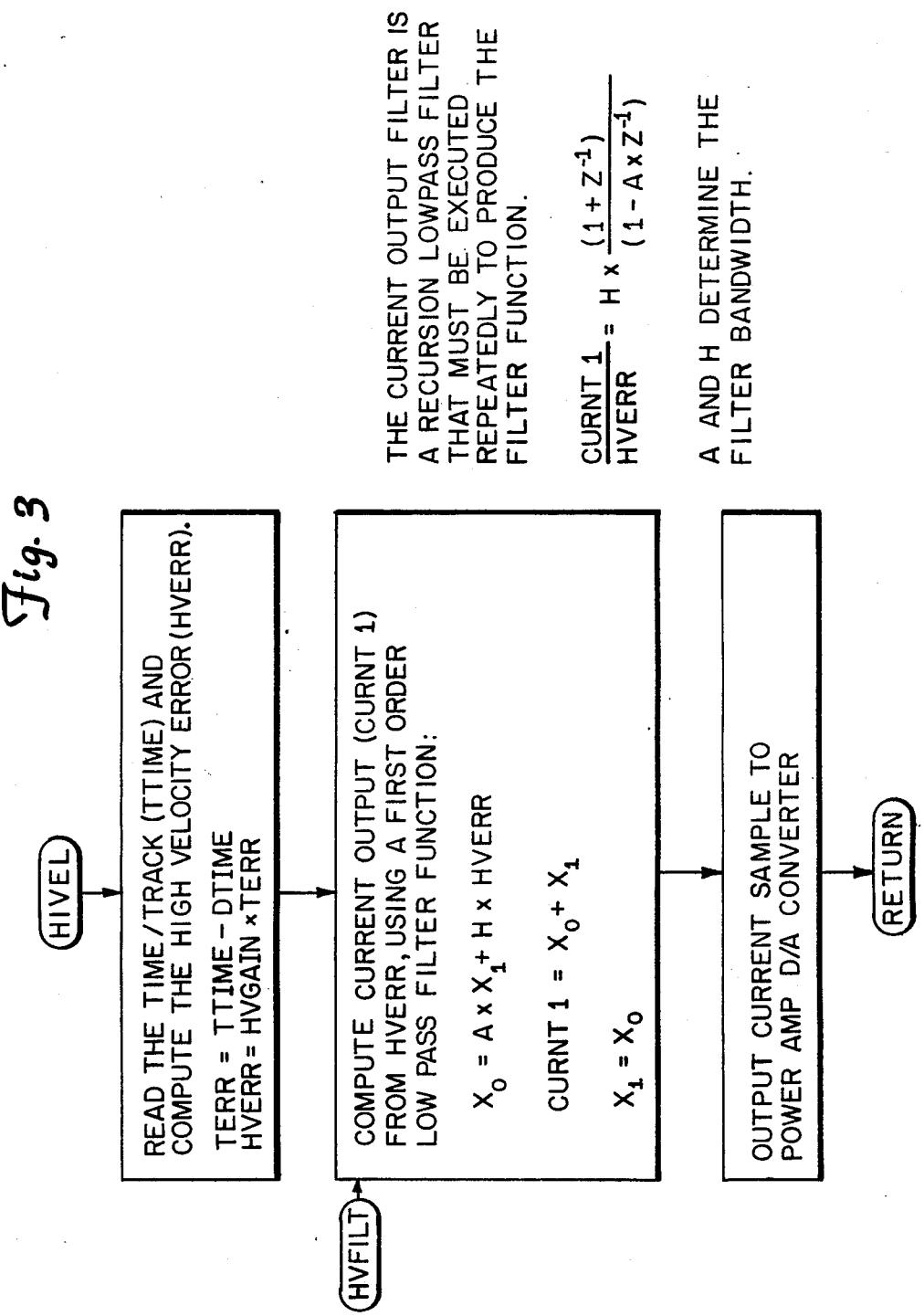

DIGITAL VELOCITY CONTROL FOR A DISK DRIVE SERVO SYSTEM

BACKGROUND OF THE INVENTION

1. Field of the Invention

The invention relates generally to disk drive servo systems and more particularly to methods and means for controlling the deceleration curves during high velocity seeks.

2. Brief Description of the Prior Art

Disk drive servo seek systems typically drive the head to a high velocity and control the velocity on deceleration so that the head can settled over a track in as short a time as possible. The servo systems obtain input from the servo tracks or other information on the disk which provides position information. Most prior systems differentiated this servo position signal to obtain velocity and adjusted the deceleration amplifier depending on how the the measured velocity varied from a desired velocity. Some systems used the time per track from servo position outputs to compute velocity of the head. See e.g., U.S. Pat. No. 4,329,721. Other systems have employed the time per track measured directly to compare to a desired time per track, and depending upon the difference, either turn on the deceleration amplifier or turned it off.

An advantage of systems employing velocity in the feedback loop is that it uses a measure of velocity to control velocity, a linear relationship. Correspondingly, systems employing time per track to control velocity have the disadvantage in that time per track is inversely proportional to velocity and a loop controlling velocity is non linear. This non linear relationship degrades velocity control accuracy.

However, computing velocity (differentiating or dividing distance by time per track) has the disadvantage in high speed systems in that if analog circuits are employed, a time lag is introduced into the feedback loop, and if digital techniques are employed, processor time to calculate velocity is high (division takes a lot of processor time). Therefore, velocity systems are inherently slower and therefore less accuracy is available. Seek speeds are thereby limited.

SUMMARY OF THE INVENTION

The invention employs a time per track technique further including a variable gain on the output to linearize the relationship between time per track and velocity to decrease instability. Gain is made proportional to distance from destination. A variable bandwidth filter is employed with a narrow bandpass at high velocities to control noise instability introduced by the high gain.

DESCRIPTION OF THE PREFERRED EMBODIMENT

Figure 1:
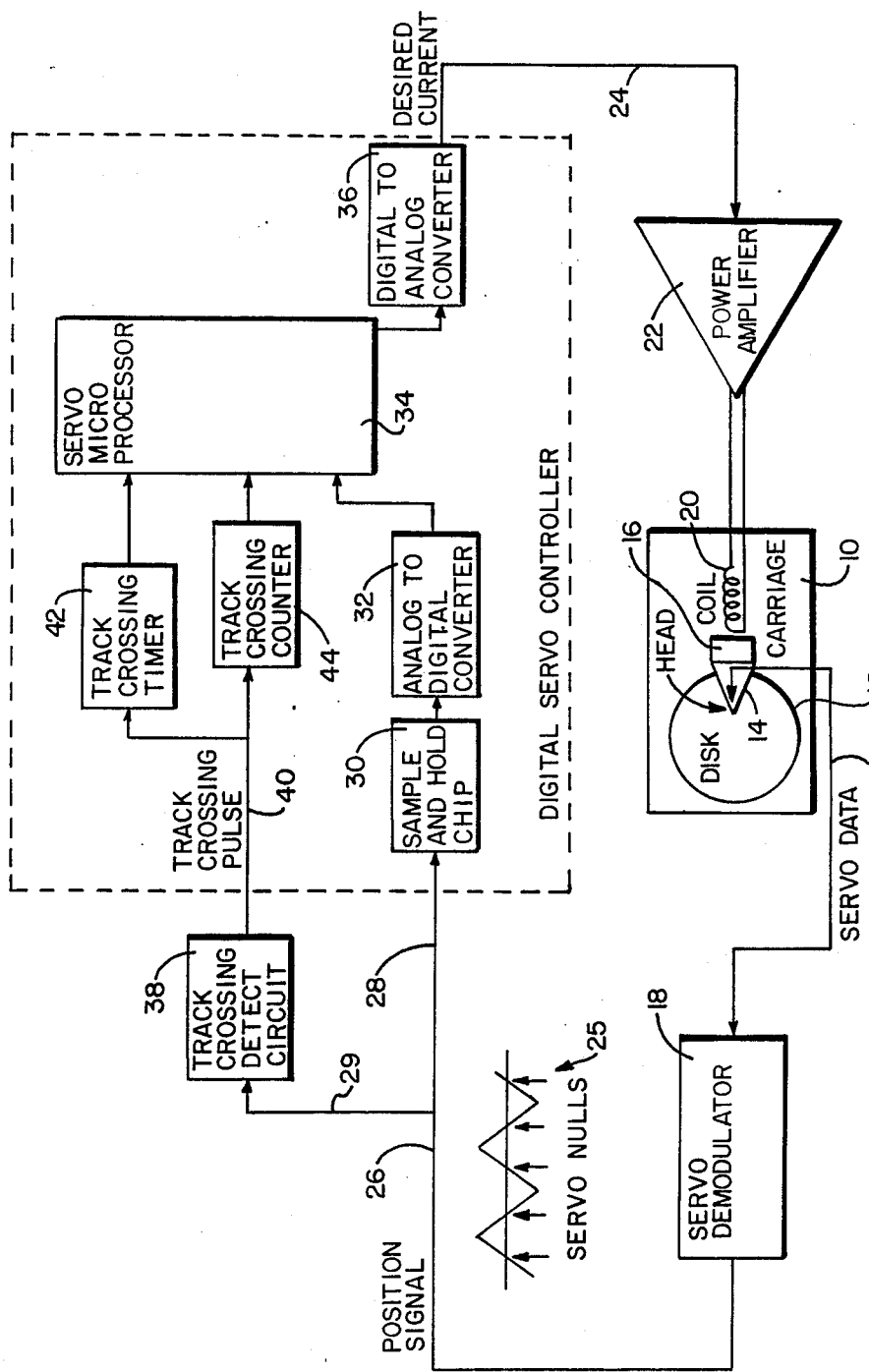

FIG. 1 shows the apparatus employed in the preferred embodiment. A disk drive 10 includes a disk 12 on which are recorded servo track which are read by head 14 during seek operations. The servo data read by head 14 is provided on line 13 to a servo demodulator 18 which provides a position signal output on line 26. The signal looks like the sawtooth pattern 25, with each null representing a track center. One branch of the signal 28 is provided to a sample and hold 30, the output of which is converted to an analog to digital converter 32, which provides a digital representation of the signal to a microprocessor 34. This digital value is differentiated to yield velocity as is conventional, but is only used when seek velocities are low (e.g., within 3 tracks of the desired track).

Another branch of the position signal 29 is provided to a track crossing detect circuit 38, which preferably detects track crossing by the presence of the servo nulls. This circuit 38 outputs on line 40 a track crossing pulse which is input to a track crossing timer (which may be of conventional design employing counters clocked by a reference oscillator which are set or reset by the track crossing pulse) and a track crossing counter. The outputs of these two devices are input to microprocessor 34, which in the preferred embodiment is a Texas Instruments TM32010.

The micro 34 uses the track crossing counter to determine the number of tracks left in a seek. This number indexes a memory to recall a predetermined desired time per track which a compared to the measured time per track from timer 42 to yield a time error value. The number is also used to adjust the gain of a variable gain value. The time error value and gain value are multiplied together and provided to a variable bandwidth digital filter (in the preferred embodiment a conventional low pass IIR digital filter) the output of which is provided by the micro 34 to a digital to analog converter (DAC) 36 whose analog current output is provided on line 24 to a power amplifier 22 to control the current in a coil 20 mounted on a carriage 16. Current in the coil causes acceleration or deceleration depending upon the direction of the current. The number (from counter 44) is also used to vary the bandwidth of the digital filter.

Figure 2:
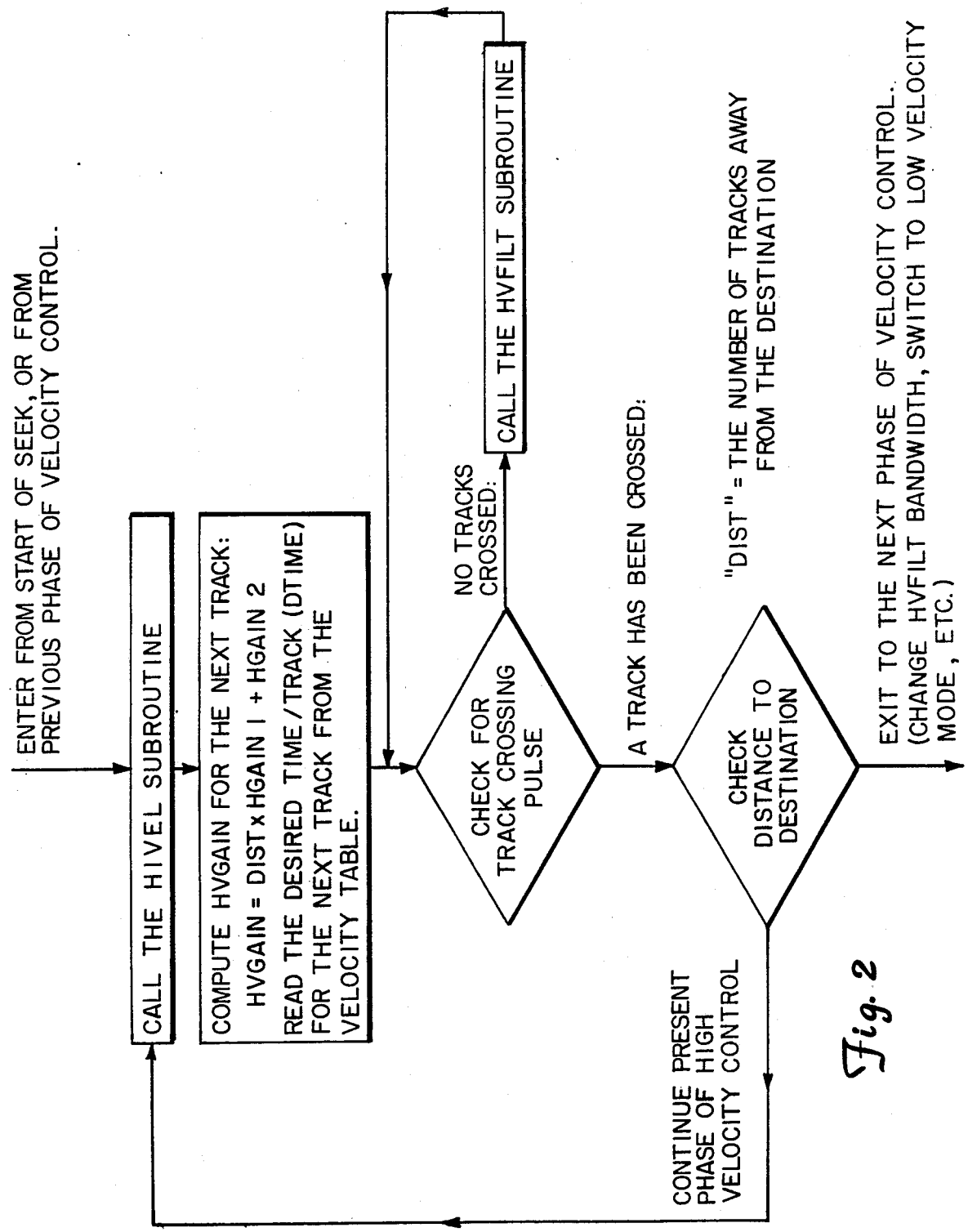

FIGS. 2 and 3 show the preferred algorithms for computing the output to the DAC 36 from the inputs from devices 42 and 44 during high velocity seek. FIG. 2 shows overall routine, and FIG. 3 shows two of the subroutines.

The FIG. 2 routing is structured as a series of loops that are used for various phases of the seek operation. These are determined by the distance remaining to reach the destination track. Each loop monitors the progress of the move, computes the forward gain variable (HVGAIN) needed by the control loop, and reads the Desired Time per Track (DTIME) from a velocity lookup table residing in the micro's memory. Velocity control feedback computations are handled by a HIVEL subroutine (FIG. 3). After each track is crossed, the high velocity control loop checks the distance remaining (number of tracks) to the destination and determines if it should remain in the present control loop or branch to the next succeeding loop.

FIG. 3 shows the High Velocity subroutine (HIVEL) and the High Velocity Filter subroutine (HVFILT). Immediately after track crossings, HIVEL is entered to read the time per track counter 42 (TTIME), compute the time per track error (TERR) by subtracting DTIME from the lookup table, and multiply the error by the high velocity gain variable (HVGAIN from FIG. 2) to obtain an error variable HVERR. This value of HVERR is used until the next track is crossed.

HVERR is provided to the HVFILT subroutine to perform a filter computation. The filter computation is a recursive function that must be executed repeatedly at a constant rate. A and H in the formula shown are filter coefficients. These are changed to vary the bandwidth of the filter. The filter coefficients in the preferred embodiment have three phases, that before 64 tracks until destination where the bandwidth is very narrow, between 64 and 3, the bandwidth is widened, and at 3 the bandwidth is widened again (here the low speed routine, not part of the present invention takes over from the high velocity routine). X0 and X1 are state variables used to pass information from one execution to the next. And CURNT1 is the filter output provided to the DAC 36.

Referring to FIG. 2, HVGAIN is made porportional to velocity by relating it to the distance from destination. Thus $$HVGAIN = DIST*HVGAIN1 + HVGAIN2$$

where DIST is the number of tracks from destination, and HVGAIN1 and HVGAIN2 are constants which are dependent upon the current to deceleration profile of each particular apparatus and must be determined experimentally.

Once the constants HVGAIN1 and HVGAIN2 are determined, HVGAIN is calculable, and DTIME is determinable. The desired velocity profile (from the prior art) is converted into a time per track profile at each track. Thus DTIME is a function of distance to destination and rate of deceleration. Do to the non linearity of the feedback loop, a strict conversion of velocity profile to time per track profile will result in an inherent error. This error is Time Error = Deceleration Current/(HVGAIN*KFWD), where Deceleration Current is the desired current to produce the required deceleration, and KFWD is a forward gain factor related to coil current and is a constant determined by the DAC 36 and power amplifier 2 circuits.

Table 1 is an example of time per track and DTIME information related to tracks. Tracks 8 to 225 represent high velocity values and tracks 1 to 7 represent low velocity values. In the table N is the number of tracks to destination; VEL is the velocity in inches per second; TIME is time to reach track zero in milliseconds; TIME/TRACK is time difference between tracks from previous track in microseconds; DVEL is the desired velocity in inches per second used in the low velocity system (not part of the present invention) and represents the a difference from actual velocity sufficient to maintain desired deceleration current; LOWVEL is a hex value of DVEL scaled according to a low velocity sense gain (not used by the present invention); LOWTAB is a value input to the microprocessor for LOWVEL (not used in the present invention), DTIME is the desired time used by the present invention and represents the actual TIME/T plus the time error that is required to maintain desired deceleration current; HITAB is the high velocity table entry for DTIME (tracks 0-7 HITAB=LOWTAB) scaled by the cylinder time clock period of track crossing timer 42 and converted to four-digit hex, and HVGAIN is the value computed from the formula given above for the given track. Also, in this example, track are space 1042 microinches apart, the acceleration constant for the coil is 238.7 ((meters/second)/second)/amp, the friction of the carriage is 0.001 amps/(m/s) and the power amp gain is 1 amp/B where B is the maximum value input to the DAC 36.

TABLE 1

| N | VEL (IPS) | TIME (MS) | TIME/T (US) | DVEL (IPS) | LOWVEL (HEX) | LOWTAB (HEX) | DTIME (US) | HITAB (HEX) | HVGAIN (AMPS/IPS) |
|---|---|---|---|---|---|---|---|---|---|
| 1 | 1.979 | 1.05 | 385.4 | 1.44 | 10F1 | 10F1 | 312.6 | 10F1 | −.7307 |
| 2 | 3.428 | 1.44 | 265.4 | 2.34 | 1BA1 | 1BA7 | 920.7 | 1BA7 | .0541 |
| 3 | 4.425 | 1.70 | 207.9 | 3.34 | 2765 | 2768 | 308.7 | 2768 | .2111 |
| 4 | 5.598 | 1.91 | 171.4 | 3.97 | 2ED2 | 2ED5 | 253.3 | 2ED5 | .2436 |
| 5 | 6.564 | 2.08 | 149.2 | 4.94 | 3A37 | 3A37 | 205.4 | 3A37 | .2583 |
| 6 | 7.405 | 2.23 | 133.9 | 5.78 | 4423 | 4426 | 176.6 | 4426 | .2667 |
| 7 | 8.160 | 2.37 | 122.5 | 6.53 | 4D0A | 4D16 | 157.0 | 4D16 | .2722 |
| 8 | 8.851 | 2.49 | 112.3 | 7.22 | 5530 | 5535 | 141.2 | 0311 | .2760 |
| 9 | 9.713 | 2.60 | 103.1 | 7.50 | 5869 | 5872 | 137.0 | 02C2 | .2663 |
| 10 | 10.504 | 2.70 | 95.8 | 8.29 | 61BE | 61C6 | 125.6 | 02AD | .2594 |
| 11 | 11.240 | 2.80 | 89.9 | 9.02 | 6A6C | 6A76 | 116.4 | 0274 | .2542 |
| 12 | 11.931 | 2.89 | 85.0 | 9.71 | 7291 | 6A70 | 108.9 | 0246 | .2502 |
| 13 | 12.583 | 2.97 | 80.8 | 10.37 | 7A43 | 6A70 | 102.6 | 0221 | .2470 |
| 14 | 13.204 | 3.06 | 77.2 | 10.99 | 7FFF | 6A70 | 97.2 | 0201 | .2444 |
| 15 | 13.796 | 3.13 | 74.0 | 11.58 | 7FFF | 6A70 | 92.5 | 01E6 | .2422 |
| 16 | 13.365 | 3.21 | 71.2 | 12.15 | 7FFF | 6A70 | 88.3 | 01CE | .2404 |
| 17 | 14.911 | 3.28 | 68.7 | 12.69 | 7FFF | 6A70 | 84.7 | 01BA | .2388 |
| 18 | 14.438 | 3.35 | 66.4 | 13.22 | 7FFF | 6A70 | 81.4 | 01A7 | .2375 |
| 19 | 15.948 | 3.41 | 64.3 | 13.73 | 7FFF | 6A70 | 78.5 | 0197 | .2363 |
| 20 | 16.442 | 3.48 | 62.5 | 14.23 | 7FFF | 6A70 | 75.8 | 0189 | .2352 |
| 21 | 16.922 | 3.54 | 60.7 | 14.71 | 7FFF | 6A70 | 73.4 | 017B | .2343 |
| 22 | 17.388 | 3.60 | 59.2 | 15.17 | 7FFF | 6A70 | 71.2 | 016F | .2335 |
| 23 | 17.842 | 3.66 | 57.7 | 15.63 | 7FFF | 6A70 | 69.2 | 0164 | .2327 |
| 24 | 18.285 | 3.72 | 56.3 | 16.07 | 7FFF | 6A70 | 67.3 | 015A | .2321 |
| 25 | 18.718 | 3.77 | 55.0 | 16.50 | 7FFF | 6A70 | 65.5 | 0150 | .2314 |
| 26 | 19.140 | 3.83 | 53.9 | 16.92 | 7FFF | 6A70 | 63.9 | 0148 | .2309 |
| 27 | 19.554 | 3.88 | 52.7 | 17.34 | 7FFF | 6A70 | 62.4 | 0140 | .2304 |
| 28 | 19.959 | 3.94 | 51.7 | 17.74 | 7FFF | 6A70 | 61.0 | 0138 | .2299 |
| 29 | 20.356 | 3.99 | 50.7 | 18.14 | 7FFF | 6A70 | 59.7 | 0131 | .2295 |
| 30 | 20.745 | 4.04 | 49.8 | 18.53 | 7FFF | 6A70 | 58.4 | 012A | .2291 |
| 31 | 21.127 | 4.09 | 48.9 | 18.91 | 7FFF | 6A70 | 57.2 | 0124 | .2287 |
| 32 | 21.502 | 4.14 | 48.0 | 19.29 | 7FFF | 6A70 | 56.1 | 011E | .2283 |
| 33 | 21.871 | 4.18 | 47.3 | 19.65 | 7FFF | 6A70 | 55.1 | 0119 | .2280 |
| 34 | 22.234 | 4.23 | 46.5 | 20.02 | 7FFF | 6A70 | 54.1 | 0113 | .2277 |
| 35 | 22.591 | 4.28 | 45.8 | 20.37 | 7FFF | 6A70 | 53.1 | 010E | .2274 |
| 36 | 22.942 | 4.32 | 45.1 | 20.73 | 7FFF | 6A70 | 52.2 | 010A | .2272 |
| 37 | 23.591 | 4.37 | 44.4 | 21.07 | 7FFF | 6A70 | 51.3 | 0105 | .2269 |
| 38 | 23.630 | 4.41 | 43.8 | 21.41 | 7FFF | 6A70 | 50.5 | 0101 | .2267 |

TABLE 1-continued

| N | VEL (IPS) | TIME (MS) | TIME/T (US) | DVEL (IPS) | LOWVEL (HEX) | LOWTAB (HEX) | DTIME (US) | HITAB (HEX) | HVGAIN (AMPS/IPS) |
|---|---|---|---|---|---|---|---|---|---|
| 39 | 23.966 | 4.46 | 43.2 | 21.75 | 7FFF | 6A70 | 49.7 | 00FD | .2264 |
| 40 | 24.297 | 4.50 | 42.6 | 22.08 | 7FFF | 6A70 | 49.0 | 00F9 | .2262 |
| 41 | 24.624 | 4.54 | 42.0 | 22.41 | 7FFF | 6A70 | 48.3 | 00F5 | .2260 |
| 42 | 24.947 | 4.59 | 41.5 | 22.73 | 7FFF | 6A70 | 47.6 | 00F1 | .2258 |
| 43 | 25.266 | 4.63 | 41.0 | 23.05 | 7FFF | 6A70 | 46.9 | 00EE | .2257 |
| 44 | 25.580 | 4.67 | 40.5 | 23.36 | 7FFF | 6A70 | 46.3 | 00EA | .2255 |
| 45 | 25.891 | 4.71 | 40.0 | 23.67 | 7FFF | 6A70 | 45.6 | 00E7 | .2253 |
| 46 | 26.199 | 4.75 | 39.5 | 23.98 | 7FFF | 6A70 | 45.1 | 00E4 | .2252 |
| 47 | 26.502 | 4.79 | 39.1 | 24.29 | 7FFF | 6A70 | 44.5 | 00E1 | .2250 |
| 48 | 26.802 | 4.83 | 38.7 | 24.59 | 7FFF | 6A70 | 43.9 | 00DE | .2249 |
| 49 | 27.099 | 4.87 | 38.2 | 24.88 | 7FFF | 6A70 | 43.4 | 00DC | .2247 |
| 50 | 27.393 | 4.90 | 37.8 | 25.18 | 7FFF | 6A70 | 42.9 | 00D9 | .2246 |
| 51 | 27.683 | 4.94 | 37.4 | 25.47 | 7FFF | 6A70 | 42.4 | 00D6 | .2245 |
| 52 | 27.971 | 4.98 | 37.1 | 25.75 | 7FFF | 6A70 | 41.9 | 00D4 | .2244 |
| 53 | 28.255 | 5.02 | 36.7 | 26.04 | 7FFF | 6A70 | 41.5 | 00D2 | .2242 |
| 54 | 28.537 | 5.05 | 36.3 | 26.32 | 7FFF | 6A70 | 41.0 | 00CF | .2241 |
| 55 | 28.816 | 5.09 | 36.0 | 26.60 | 7FFF | 6A70 | 40.6 | 00CD | .2240 |
| 56 | 29.092 | 5.12 | 35.6 | 26.88 | 7FFF | 6A70 | 40.1 | 00CB | .2239 |
| 57 | 29.366 | 5.16 | 35.3 | 27.15 | 7FFF | 6A70 | 39.7 | 00C9 | .2238 |
| 58 | 29.637 | 5.20 | 35.0 | 27.42 | 7FFF | 6A70 | 39.3 | 00C7 | .2237 |
| 59 | 29.906 | 5.23 | 34.7 | 27.69 | 7FFF | 6A70 | 38.9 | 00C5 | .2236 |
| 60 | 30.172 | 5.27 | 34.4 | 27.96 | 7FFF | 6A70 | 38.6 | 00C3 | .2236 |
| 61 | 30.436 | 5.30 | 34.1 | 28.22 | 7FFF | 6A70 | 38.2 | 00C1 | .2235 |
| 62 | 30.698 | 5.33 | 33.8 | 28.48 | 7FFF | 6A70 | 37.8 | 00BF | .2234 |
| 63 | 30.958 | 5.37 | 33.5 | 28.74 | 7FFF | 6A70 | 37.5 | 00BD | .2233 |
| 64 | 31.215 | 5.40 | 33.2 | 29.00 | 7FFF | 6A70 | 37.2 | 00BB | .2232 |
| 65 | 31.470 | 5.43 | 33.0 | 29.25 | 7FFF | 6A70 | 36.8 | 00BA | .2232 |
| 66 | 31.723 | 5.47 | 32.7 | 29.51 | 7FFF | 6A70 | 36.5 | 00B8 | .2231 |
| 67 | 31.975 | 5.50 | 32.5 | 29.76 | 7FFF | 6A70 | 36.2 | 00B7 | .2230 |
| 68 | 32.224 | 5.53 | 32.2 | 30.01 | 7FFF | 6A70 | 35.9 | 00B5 | .2229 |
| 69 | 32.471 | 5.57 | 32.0 | 30.25 | 7FFF | 6A70 | 35.6 | 00B3 | .2229 |
| 70 | 32.717 | 5.60 | 31.7 | 30.50 | 7FFF | 6A70 | 35.3 | 00B2 | .2228 |
| 71 | 32.960 | 5.63 | 31.5 | 30.74 | 7FFF | 6A70 | 35.0 | 00B1 | .2228 |
| 72 | 33.202 | 5.66 | 31.3 | 30.99 | 7FFF | 6A70 | 34.7 | 00AF | .2227 |
| 73 | 33.442 | 5.69 | 31.0 | 31.23 | 7FFF | 6A70 | 34.5 | 00AE | .2226 |
| 74 | 33.681 | 5.72 | 30.8 | 31.46 | 7FFF | 6A70 | 34.2 | 00AC | .2226 |
| 75 | 33.917 | 5.75 | 30.6 | 31.70 | 7FFF | 6A70 | 33.9 | 00AB | .2225 |
| 76 | 34.152 | 5.78 | 30.4 | 31.94 | 7FFF | 6A70 | 33.7 | 00AA | .2225 |
| 77 | 34.386 | 5.81 | 30.2 | 32.17 | 7FFF | 6A70 | 33.4 | 00A8 | .2224 |
| 78 | 34.618 | 5.84 | 30.0 | 32.40 | 7FFF | 6A70 | 33.2 | 00A7 | .2224 |
| 79 | 34.848 | 5.87 | 29.8 | 32.63 | 7FFF | 6A70 | 33.0 | 00A6 | .2223 |
| 80 | 35.077 | 5.90 | 29.6 | 32.86 | 7FFF | 6A70 | 32.7 | 00A5 | .2223 |
| 81 | 35.304 | 5.93 | 29.4 | 33.09 | 7FFF | 6A70 | 32.5 | 00A4 | .2222 |
| 82 | 35.530 | 5.96 | 29.2 | 33.31 | 7FFF | 6A70 | 32.3 | 00A2 | .2222 |
| 83 | 35.755 | 5.99 | 29.1 | 33.54 | 7FFF | 6A70 | 32.1 | 00A1 | .2221 |
| 84 | 35.978 | 6.02 | 28.9 | 33.76 | 7FFF | 6A70 | 31.8 | 00A0 | .2221 |
| 85 | 36.199 | 6.05 | 28.7 | 33.98 | 7FFF | 6A70 | 31.6 | 009F | .2220 |
| 86 | 36.420 | 6.08 | 28.5 | 34.20 | 7FFF | 6A70 | 31.4 | 009E | .2220 |
| 87 | 36.639 | 6.11 | 28.4 | 34.42 | 7FFF | 6A70 | 31.2 | 009D | .2220 |
| 88 | 36.856 | 6.14 | 28.2 | 34.64 | 7FFF | 6A70 | 31.0 | 009C | .2219 |
| 89 | 37.073 | 6.16 | 28.0 | 34.86 | 7FFF | 6A70 | 30.8 | 009B | .2219 |
| 90 | 37.288 | 6.19 | 27.9 | 35.07 | 7FFF | 6A70 | 30.6 | 009A | .2218 |
| 91 | 37.502 | 6.22 | 27.7 | 35.29 | 7FFF | 6A70 | 30.4 | 0099 | .2218 |
| 92 | 37.715 | 6.25 | 27.6 | 35.50 | 7FFF | 6A70 | 30.3 | 0098 | .2218 |
| 93 | 37.926 | 6.28 | 27.4 | 35.71 | 7FFF | 6A70 | 30.1 | 0097 | .2217 |
| 94 | 38.137 | 6.30 | 27.2 | 35.92 | 7FFF | 6A70 | 29.9 | 0096 | .2217 |
| 95 | 38.346 | 6.33 | 27.1 | 36.13 | 7FFF | 6A70 | 29.7 | 0095 | .2217 |
| 96 | 38.554 | 6.36 | 27.0 | 36.34 | 7FFF | 6A70 | 29.5 | 0095 | .2216 |
| 97 | 38.761 | 6.38 | 26.8 | 36.54 | 7FFF | 6A70 | 29.4 | 0094 | .2216 |
| 98 | 38.967 | 6.41 | 26.7 | 36.75 | 7FFF | 6A70 | 29.2 | 0093 | .2216 |
| 99 | 39.171 | 6.44 | 26.5 | 36.95 | 7FFF | 6A70 | 29.0 | 0092 | .2215 |
| 100 | 39.375 | 6.46 | 26.4 | 37.16 | 7FFF | 6A70 | 28.9 | 0091 | .2215 |
| 101 | 39.578 | 6.49 | 26.3 | 37.36 | 7FFF | 6A70 | 28.7 | 0090 | .2215 |
| 102 | 39.779 | 6.52 | 26.1 | 37.56 | 7FFF | 6A70 | 28.6 | 0090 | .2215 |
| 103 | 39.980 | 6.54 | 26.0 | 37.76 | 7FFF | 6A70 | 28.4 | 008F | .2214 |
| 104 | 40.180 | 6.57 | 25.9 | 37.96 | 7FFF | 6A70 | 28.3 | 008E | .2214 |
| 105 | 40.378 | 6.59 | 25.7 | 38.16 | 7FFF | 6A70 | 28.1 | 008D | .2214 |
| 106 | 40.576 | 6.62 | 25.6 | 38.36 | 7FFF | 6A70 | 28.0 | 008D | .2213 |
| 107 | 40.773 | 6.65 | 25.5 | 38.56 | 7FFF | 6A70 | 27.8 | 008C | .2213 |
| 108 | 40.968 | 6.67 | 25.4 | 38.75 | 7FFF | 6A70 | 27.7 | 008B | .2213 |
| 109 | 41.163 | 6.70 | 25.3 | 38.95 | 7FFF | 6A70 | 27.5 | 008A | .2213 |
| 110 | 41.357 | 6.72 | 25.1 | 39.14 | 7FFF | 6A70 | 27.4 | 008A | .2212 |
| 111 | 41.550 | 6.75 | 25.0 | 39.33 | 7FFF | 6A70 | 27.2 | 0089 | .2212 |
| 112 | 41.742 | 6.77 | 24.9 | 39.53 | 7FFF | 6A70 | 27.1 | 0088 | .2212 |
| 113 | 41.933 | 6.80 | 24.8 | 39.72 | 7FFF | 6A70 | 27.0 | 0088 | .2212 |
| 114 | 42.124 | 6.82 | 24.7 | 39.91 | 7FFF | 6A70 | 26.9 | 0087 | .2211 |
| 115 | 42.313 | 6.85 | 24.6 | 40.10 | 7FFF | 6A70 | 26.7 | 0086 | .2211 |
| 116 | 42.502 | 6.87 | 24.5 | 40.29 | 7FFF | 6A70 | 26.6 | 0086 | .2211 |
| 117 | 42.690 | 6.90 | 24.4 | 40.47 | 7FFF | 6A70 | 26.5 | 0085 | .2211 |
| 118 | 42.877 | 6.92 | 24.2 | 40.66 | 7FFF | 6A70 | 26.3 | 0084 | .2211 |

TABLE 1-continued

| N | VEL (IPS) | TIME (MS) | TIME/T (US) | DVEL (IPS) | LOWVEL (HEX) | LOWTAB (HEX) | DTIME (US) | HITAB (HEX) | HVGAIN (AMPS/IPS) |
|---|---|---|---|---|---|---|---|---|---|
| 119 | 43.063 | 6.94 | 24.1 | 40.85 | 7FFF | 6A70 | 26.2 | 0084 | .2210 |
| 120 | 43.248 | 6.97 | 24.0 | 41.03 | 7FFF | 6A70 | 26.1 | 0083 | .2210 |
| 121 | 43.433 | 6.99 | 23.9 | 41.22 | 7FFF | 6A70 | 26.0 | 0083 | .2210 |
| 122 | 43.617 | 7.02 | 23.8 | 41.40 | 7FFF | 6A70 | 25.9 | 0082 | .2210 |
| 123 | 43.800 | 7.04 | 23.7 | 41.58 | 7FFF | 6A70 | 25.7 | 0081 | .2210 |
| 124 | 43.982 | 7.06 | 23.6 | 41.77 | 7FFF | 6A70 | 25.6 | 0081 | .2209 |
| 125 | 44.163 | 7.09 | 23.5 | 41.95 | 7FFF | 6A70 | 25.5 | 0080 | .2209 |
| 126 | 44.344 | 7.11 | 23.5 | 42.13 | 7FFF | 6A70 | 25.4 | 0080 | .2209 |
| 127 | 44.524 | 7.13 | 23.4 | 42.31 | 7FFF | 6A70 | 25.3 | 007F | .2209 |
| 128 | 44.704 | 7.16 | 23.3 | 42.49 | 7FFF | 6A70 | 25.2 | 007F | .2209 |
| 129 | 44.882 | 7.18 | 23.2 | 42.67 | 7FFF | 6A70 | 25.1 | 007E | .2208 |
| 130 | 45.060 | 7.20 | 23.1 | 42.84 | 7FFF | 6A70 | 25.0 | 007D | .2208 |
| 131 | 45.237 | 7.23 | 23.0 | 43.02 | 7FFF | 6A70 | 24.9 | 007D | .2208 |
| 132 | 45.414 | 7.25 | 22.9 | 43.20 | 7FFF | 6A70 | 24.8 | 007C | .2208 |
| 133 | 45.590 | 7.27 | 22.8 | 43.37 | 7FFF | 6A70 | 24.7 | 007C | .2208 |
| 134 | 45.765 | 7.30 | 22.7 | 43.55 | 7FFF | 6A70 | 24.6 | 007B | .2208 |
| 135 | 45.939 | 7.32 | 22.6 | 43.72 | 7FFF | 6A70 | 24.5 | 007B | .2207 |
| 136 | 46.113 | 7.34 | 22.6 | 43.90 | 7FFF | 6A70 | 24.4 | 007A | .2207 |
| 137 | 46.286 | 7.36 | 22.5 | 44.07 | 7FFF | 6A70 | 24.3 | 007A | .2207 |
| 138 | 46.459 | 7.39 | 22.4 | 44.24 | 7FFF | 6A70 | 24.2 | 0079 | .2207 |
| 139 | 46.631 | 7.41 | 22.3 | 44.41 | 7FFF | 6A70 | 24.1 | 0079 | .2207 |
| 140 | 46.802 | 7.43 | 22.2 | 44.59 | 7FFF | 6A70 | 24.0 | 0078 | .2207 |
| 141 | 46.973 | 7.45 | 22.1 | 44.76 | 7FFF | 6A70 | 23.9 | 0079 | .2206 |
| 142 | 47.143 | 7.48 | 22.1 | 44.93 | 7FFF | 6A70 | 23.8 | 0077 | .2206 |
| 143 | 47.312 | 7.50 | 22.0 | 45.10 | 7FFF | 6A70 | 23.7 | 0077 | .2206 |
| 144 | 47.381 | 7.52 | 21.9 | 45.26 | 7FFF | 6A70 | 23.6 | 0077 | .2206 |
| 145 | 47.649 | 7.54 | 21.8 | 45.43 | 7FFF | 6A70 | 23.5 | 0076 | .2206 |
| 146 | 47.817 | 7.56 | 21.8 | 45.60 | 7FFF | 6A70 | 23.4 | 0076 | .2206 |
| 147 | 47.984 | 7.59 | 21.7 | 45.77 | 7FFF | 6A70 | 23.4 | 0075 | .2206 |
| 148 | 48.150 | 7.61 | 21.6 | 45.93 | 7FFF | 6A70 | 23.3 | 0075 | .2206 |
| 149 | 48.316 | 7.63 | 21.5 | 46.10 | 7FFF | 6A70 | 23.2 | 0074 | .2205 |
| 150 | 48.481 | 7.65 | 21.5 | 46.26 | 7FFF | 6A70 | 23.1 | 0074 | .2205 |
| 151 | 48.646 | 7.67 | 21.4 | 46.43 | 7FFF | 6A70 | 23.0 | 0073 | .2205 |
| 152 | 48.810 | 7.69 | 21.3 | 46.59 | 7FFF | 6A70 | 22.9 | 0073 | .2205 |
| 153 | 48.974 | 7.71 | 21.2 | 46.76 | 7FFF | 6A70 | 22.9 | 0073 | .2205 |
| 154 | 48.137 | 7.74 | 21.2 | 46.92 | 7FFF | 6A70 | 22.8 | 0072 | .2205 |
| 155 | 49.299 | 7.76 | 21.1 | 47.08 | 7FFF | 6A70 | 22.7 | 0072 | .2205 |
| 156 | 49.461 | 7.78 | 21.0 | 47.24 | 7FFF | 6A70 | 22.6 | 0071 | .2204 |
| 157 | 49.623 | 7.80 | 21.0 | 47.41 | 7FFF | 6A70 | 22.5 | 0071 | .2204 |
| 158 | 49.784 | 7.82 | 20.9 | 47.57 | 7FFF | 6A70 | 22.5 | 0071 | .2204 |
| 159 | 49.944 | 7.84 | 20.8 | 47.73 | 7FFF | 6A70 | 22.4 | 0070 | .2204 |
| 160 | 50.104 | 7.86 | 20.8 | 47.89 | 7FFF | 6A70 | 22.3 | 0070 | .2204 |
| 161 | 50.264 | 7.88 | 20.7 | 48.05 | 7FFF | 6A70 | 22.2 | 0070 | .2204 |
| 162 | 50.423 | 7.90 | 20.6 | 48.21 | 7FFF | 6A70 | 22.2 | 006F | .2204 |
| 163 | 50.581 | 7.92 | 20.6 | 48.36 | 7FFF | 6A70 | 22.1 | 006F | .2204 |
| 164 | 50.739 | 7.94 | 20.5 | 48.52 | 7FFF | 6A70 | 22.0 | 006E | .2204 |
| 165 | 50.896 | 7.96 | 20.4 | 48.68 | 7FFF | 6A70 | 21.9 | 006E | .2203 |
| 166 | 50.053 | 7.99 | 20.4 | 48.84 | 7FFF | 6A70 | 21.9 | 006E | .2203 |
| 167 | 50.210 | 8.01 | 20.3 | 48.99 | 7FFF | 6A70 | 21.8 | 006D | .2203 |
| 168 | 51.366 | 8.03 | 20.3 | 49.15 | 7FFF | 6A70 | 21.7 | 006D | .2203 |
| 169 | 51.521 | 8.05 | 20.2 | 49.30 | 7FFF | 6A70 | 21.7 | 006D | .2203 |
| 170 | 51.676 | 8.07 | 20.1 | 49.46 | 7FFF | 6A70 | 21.6 | 006C | .2203 |
| 171 | 51.831 | 8.09 | 20.1 | 49.61 | 7FFF | 6A70 | 21.5 | 006C | .2203 |
| 172 | 51.985 | 8.11 | 20.0 | 49.77 | 7FFF | 6A70 | 21.4 | 006C | .2203 |
| 173 | 52.139 | 8.13 | 20.0 | 49.92 | 7FFF | 6A70 | 21.4 | 006B | .2203 |
| 174 | 52.292 | 8.15 | 19.9 | 50.08 | 7FFF | 6A70 | 21.3 | 006B | .2203 |
| 175 | 52.445 | 8.17 | 19.8 | 50.23 | 7FFF | 6A70 | 21.2 | 006B | .2202 |
| 176 | 52.597 | 8.19 | 19.8 | 50.38 | 7FFF | 6A70 | 21.2 | 006A | .2202 |
| 177 | 52.749 | 8.21 | 19.7 | 50.53 | 7FFF | 6A70 | 21.1 | 006A | .2202 |
| 178 | 52.900 | 8.23 | 19.7 | 50.68 | 7FFF | 6A70 | 21.1 | 006A | .2202 |
| 179 | 53.051 | 8.25 | 19.6 | 50.83 | 7FFF | 6A70 | 21.0 | 0069 | .2202 |
| 180 | 53.202 | 8.27 | 19.6 | 50.99 | 7FFF | 6A70 | 20.9 | 0069 | .2202 |
| 181 | 53.352 | 8.28 | 19.5 | 51.14 | 7FFF | 6A70 | 20.9 | 0069 | .2202 |
| 182 | 53.502 | 8.30 | 19.4 | 51.29 | 7FFF | 6A70 | 20.8 | 0068 | .2202 |
| 183 | 53.651 | 8.32 | 19.4 | 51.43 | 7FFF | 6A70 | 20.7 | 0068 | .2202 |
| 184 | 53.800 | 8.34 | 19.3 | 51.58 | 7FFF | 6A70 | 20.7 | 0068 | .2202 |
| 185 | 53.949 | 8.36 | 19.3 | 51.73 | 7FFF | 6A70 | 20.6 | 0067 | .2202 |
| 186 | 54.097 | 8.38 | 19.2 | 51.88 | 7FFF | 6A70 | 20.6 | 0067 | .2201 |
| 187 | 54.244 | 8.40 | 19.2 | 52.03 | 7FFF | 6A70 | 20.5 | 0067 | .2201 |
| 188 | 54.392 | 8.42 | 19.1 | 52.17 | 7FFF | 6A70 | 20.4 | 0066 | .2201 |
| 189 | 54.539 | 8.44 | 19.1 | 52.32 | 7FFF | 6A70 | 20.4 | 0066 | .2201 |
| 190 | 54.685 | 8.46 | 19.0 | 52.47 | 7FFF | 6A70 | 20.3 | 0066 | .2201 |
| 191 | 54.831 | 8.48 | 19.0 | 52.61 | 7FFF | 6A70 | 20.3 | 0066 | .2201 |
| 192 | 54.977 | 8.50 | 18.9 | 52.76 | 7FFF | 6A70 | 20.2 | 0065 | .2201 |
| 193 | 54.122 | 8.52 | 18.9 | 52.91 | 7FFF | 6A70 | 20.2 | 0065 | .2201 |
| 194 | 54.267 | 8.53 | 18.8 | 53.05 | 7FFF | 6A70 | 20.1 | 0065 | .2201 |
| 195 | 54.412 | 8.55 | 18.8 | 53.19 | 7FFF | 6A70 | 20.0 | 0064 | .2201 |
| 196 | 54.556 | 8.57 | 18.7 | 53.34 | 7FFF | 6A70 | 20.0 | 0064 | .2201 |
| 197 | 55.700 | 8.59 | 18.7 | 53.48 | 7FFF | 6A70 | 19.9 | 0064 | .2201 |
| 198 | 55.843 | 8.61 | 18.6 | 53.63 | 7FFF | 6A70 | 19.9 | 0064 | .2201 |

TABLE 1-continued

| N | VEL (IPS) | TIME (MS) | TIME/T (US) | DVEL (IPS) | LOWVEL (HEX) | LOWTAB (HEX) | DTIME (US) | HITAB (HEX) | HVGAIN (AMPS/IPS) |
|---|---|---|---|---|---|---|---|---|---|
| 199 | 55.986 | 8.63 | 18.6 | 53.77 | 7FFF | 6A70 | 19.8 | 0063 | .2200 |
| 200 | 56.129 | 8.65 | 18.5 | 53.91 | 7FFF | 6A70 | 19.8 | 0063 | .2200 |
| 201 | 56.271 | 8.66 | 18.5 | 54.05 | 7FFF | 6A70 | 19.7 | 0063 | .2200 |
| 202 | 56.413 | 8.68 | 18.4 | 54.20 | 7FFF | 6A70 | 19.7 | 0063 | .2200 |
| 203 | 56.555 | 8.70 | 18.4 | 54.34 | 7FFF | 6A70 | 19.6 | 0062 | .2200 |
| 204 | 56.696 | 8.72 | 18.4 | 54.48 | 7FFF | 6A70 | 19.6 | 0062 | .2200 |
| 205 | 56.837 | 8.74 | 18.3 | 54.62 | 7FFF | 6A70 | 19.5 | 0062 | .2200 |
| 206 | 56.978 | 8.76 | 18.3 | 54.73 | 7FFF | 6A70 | 19.5 | 0062 | .2200 |
| 207 | 57.118 | 8.78 | 18.2 | 54.90 | 7FFF | 6A70 | 19.4 | 0061 | .2200 |
| 208 | 57.258 | 8.79 | 18.2 | 55.04 | 7FFF | 6A70 | 19.4 | 0061 | .2200 |
| 209 | 57.397 | 8.81 | 18.1 | 55.18 | 7FFF | 6A70 | 19.3 | 0061 | .2200 |
| 210 | 57.537 | 8.83 | 18.1 | 55.32 | 7FFF | 6A70 | 19.3 | 0061 | .2200 |
| 211 | 57.676 | 8.85 | 18.0 | 55.46 | 7FFF | 6A70 | 19.2 | 0060 | .2200 |
| 212 | 57.814 | 8.87 | 18.0 | 55.60 | 7FFF | 6A70 | 19.2 | 0060 | .2200 |
| 213 | 57.952 | 8.88 | 18.0 | 55.74 | 7FFF | 6A70 | 19.1 | 0060 | .2200 |
| 214 | 58.090 | 8.90 | 17.9 | 55.87 | 7FFF | 6A70 | 19.1 | 0060 | .2199 |
| 215 | 58.228 | 8.92 | 17.9 | 56.01 | 7FFF | 6A70 | 19.0 | 005F | .2199 |
| 216 | 58.365 | 8.94 | 17.8 | 56.15 | 7FFF | 6A70 | 19.0 | 005F | .2199 |
| 217 | 58.502 | 8.96 | 17.8 | 56.29 | 7FFF | 6A70 | 18.9 | 005F | .2199 |
| 218 | 58.639 | 8.97 | 17.7 | 56.42 | 7FFF | 6A70 | 18.9 | 005F | .2199 |
| 219 | 58.775 | 8.99 | 17.7 | 56.56 | 7FFF | 6A70 | 18.8 | 005E | .2199 |
| 220 | 58.911 | 9.01 | 17.7 | 56.69 | 7FFF | 6A70 | 18.8 | 005E | .2199 |
| 221 | 59.046 | 9.03 | 17.6 | 56.83 | 7FFF | 6A70 | 18.7 | 005E | .2199 |
| 222 | 59.182 | 9.04 | 17.6 | 56.96 | 7FFF | 6A70 | 18.7 | 005E | .2199 |
| 223 | 59.317 | 9.06 | 17.5 | 57.10 | 7FFF | 6A70 | 18.6 | 005D | .2199 |
| 224 | 59.451 | 9.08 | 17.5 | 57.23 | 7FFF | 6A70 | 18.6 | 005D | .2199 |
| 225 | 59.586 | 9.10 | 17.5 | 57.37 | 7FFF | 6A70 | 18.6 | 005D | .2199 |
| 226 | 59.720 | 9.11 | 17.4 | 57.50 | 7FFF | 6A70 | 18.5 | 005D | .2199 |
| 227 | 59.854 | 9.13 | 17.4 | 57.64 | 7FFF | 6A70 | 18.5 | 005D | .2199 |
| 228 | 59.987 | 9.15 | 17.4 | 57.77 | 7FFF | 6A70 | 18.4 | 005C | .2199 |
| 229 | 60.121 | 9.17 | 17.3 | 57.90 | 7FFF | 6A70 | 18.4 | 005C | .2199 |
| 230 | 60.253 | 9.18 | 17.3 | 58.04 | 7FFF | 6A70 | 18.3 | 005C | .2199 |
| 231 | 60.386 | 9.20 | 17.2 | 58.17 | 7FFF | 6A70 | 18.3 | 005C | .2198 |
| 232 | 60.518 | 9.22 | 17.2 | 58.30 | 7FFF | 6A70 | 18.3 | 005B | .2198 |
| 233 | 60.651 | 9.24 | 17.2 | 58.43 | 7FFF | 6A70 | 18.2 | 005B | .2198 |
| 234 | 60.782 | 9.25 | 17.1 | 58.57 | 7FFF | 6A70 | 18.2 | 005B | .2198 |
| 235 | 60.914 | 9.27 | 17.1 | 58.70 | 7FFF | 6A70 | 18.1 | 005B | .2198 |
| 236 | 61.045 | 9.29 | 17.1 | 58.83 | 7FFF | 6A70 | 18.1 | 005B | .2198 |
| 237 | 61.176 | 9.30 | 17.0 | 58.96 | 7FFF | 6A70 | 18.0 | 0058 | .2198 |
| 238 | 61.307 | 9.32 | 17.0 | 59.09 | 7FFF | 6A70 | 18.0 | 005A | .2198 |
| 239 | 61.437 | 9.34 | 16.9 | 59.22 | 7FFF | 6A70 | 18.0 | 005A | .2198 |
| 240 | 61.567 | 9.35 | 16.9 | 59.35 | 7FFF | 6A70 | 17.9 | 005A | .2198 |
| 241 | 61.697 | 9.37 | 16.9 | 59.48 | 7FFF | 6A70 | 17.9 | 005A | .2198 |
| 242 | 61.826 | 9.39 | 16.8 | 59.61 | 7FFF | 6A70 | 17.8 | 0059 | .2198 |
| 243 | 61.956 | 9.41 | 16.8 | 59.74 | 7FFF | 6A70 | 17.8 | 0059 | .2198 |
| 244 | 62.085 | 9.42 | 16.8 | 59.87 | 7FFF | 6A70 | 17.8 | 0059 | .2198 |
| 245 | 62.213 | 9.44 | 16.7 | 60.00 | 7FFF | 6A70 | 17.7 | 0059 | .2198 |
| 246 | 62.342 | 9.46 | 16.7 | 60.13 | 7FFF | 6A70 | 17.7 | 0059 | .2198 |
| 247 | 62.470 | 9.47 | 16.7 | 60.25 | 7FFF | 6A70 | 17.7 | 0059 | .2198 |
| 248 | 62.598 | 9.49 | 16.6 | 60.38 | 7FFF | 6A70 | 17.6 | 0058 | .2198 |
| 249 | 62.726 | 9.51 | 16.6 | 60.51 | 7FFF | 6A70 | 17.6 | 0058 | .2198 |
| 250 | 62.853 | 9.52 | 16.6 | 60.64 | 7FFF | 6A70 | 17.5 | 0058 | .2197 |
| 251 | 62.980 | 9.54 | 16.5 | 60.76 | 7FFF | 6A70 | 17.5 | 0058 | .2197 |
| 252 | 63.107 | 9.56 | 16.5 | 60.89 | 7FFF | 6A70 | 17.5 | 0058 | .2197 |
| 253 | 63.234 | 9.57 | 16.5 | 61.02 | 7FFF | 6A70 | 17.4 | 0057 | .2197 |
| 254 | 63.360 | 9.59 | 16.4 | 61.14 | 7FFF | 6A70 | 17.4 | 0057 | .2197 |
| 255 | 63.486 | 9.60 | 16.4 | 61.27 | 7FFF | 6A70 | 17.4 | 0057 | .2197 |

I claim:

1. A high velocity seek apparatus comprising;
  timer means for determining a TTIME time per track of a disk drive head crossing tracks during a high velocity seek;
  counter means for determining the number of tracks to destination;
  means responsive to the number for indexing a lookup table to determine a DTIME desired time per track value;
  means for determining a TERR difference between TTIME and DTIME;
  means responsive to the number for adjusting a gain variable HVGAIN according to the formula $HVGAIN = \text{number} * HVGAIN1 + HVGAIN2$ where HVGAIN1 and HVGAIN2 are constants;
  means for determining a HVERR scaled error value according to the formula $HVERR = HVGAIN * TERR$ means for filtering HVERR to produce a CURNT1 filtered value;
  means for converting CURNT1 into a current; and
  means for inputting the current into a coil mounted on the head carriage of a disk drive to produce deceleration of the head.

2. The apparatus of claim 1 wherein said means for filtering comprises a variable bandwidth filter and further including means for providing a narrower bandwidth at high track numbers to destination and a wider bandwidth at lower track numbers to destination.

3. The apparatus of claim 1 wherein said DTIME values are calculated from a desired velocity profile plus a time error value computed by dividing a desired deceleration current value by the HVGAIN value at each track and further divided by the forward current gain of said means for converting said CURNT1 value to a current.

* * * * *